UNITED STATES PATENT OFFICE.

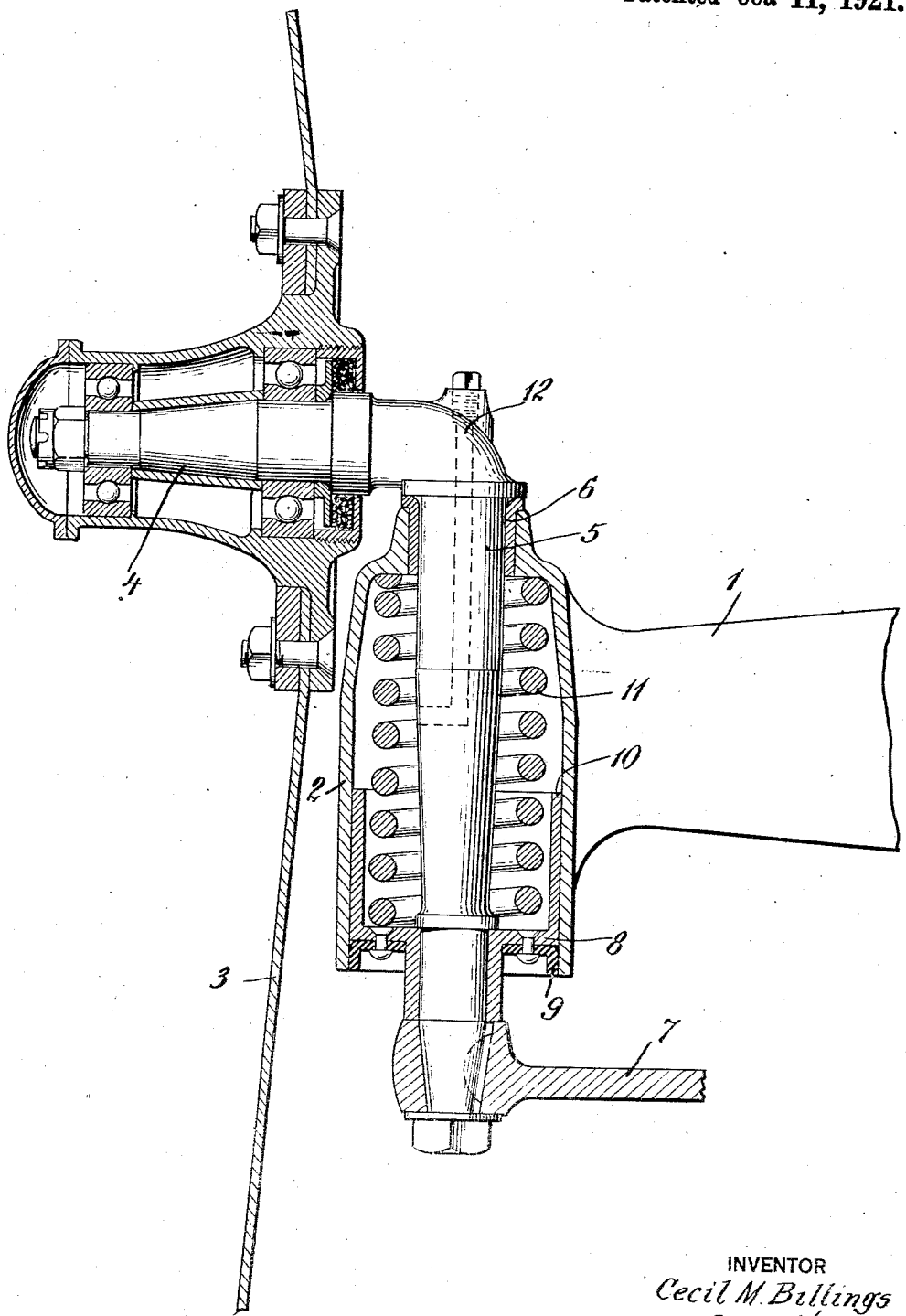

CECIL McCOBB BILLINGS, OF BROOKLYN, NEW YORK, ASSIGNOR TO DELMORE MANUFACTURING CO., INC., OF NEW YORK, N. Y., A CORPORATION OF NEW YORK.

VEHICLE-AXLE SUPPORT.

1,393,004.　　　　　Specification of Letters Patent.　　Patented Oct. 11, 1921.

Application filed July 29, 1919. Serial No. 314,066.

*To all whom it may concern:*

Be it known that I, CECIL M. BILLINGS, a citizen of the United States of America, and a resident of Brooklyn, county of Kings, and State of New York, have invented certain new and useful Improvements in Vehicle-Axle Supports, of which the following is a specification, reference being had to the accompanying drawings, forming a part thereof.

My present invention has for its object to provide a simple and practical form of spring suspension for the steering wheels of a road vehicle.

Briefly stated the invention embodies a spring support between the road wheel and vehicle frame, comprising a spring interposed between suitable spring abutments carried by said movable parts. Preferably one of these abutments is provided in the form of a spring housing carried by the vehicle axle and the other abutment is in the form of a piston element working within the said housing and carried by the steering spindle which has a bearing in the housing.

Various other features of the invention will appear as the specification proceeds.

In the accompanying drawings, I have illustrated by means of a broken sectional view one form of the invention particularly designed for a light style of motor vehicle used for parcel delivery purposes.

In this drawing a part of the vehicle is indicated at 1, said part constituting the front axle of the vehicle. Carried by said axle at the opposite ends thereof are upright substantially cylindrical spring housings. As these housings are duplicated only one of them is shown, the same being designated 2.

A portion of one of the road wheels is indicated at 3, the same being usually mounted on ball bearings such as indicated, carried by the angularly projecting bearing portion 4 of the steering spindle, said spindle having the usual upright portion 5 which is shown journaled in the upper end of the spring housing 6. This upright portion of the spindle which is journaled in the housing projects down through the housing, and is provided at its lower end with a suitable steering arm such as indicated at 7. Also carried by the upright portion of the steering spindle and working within the housing is a piston element 8. This piston may be provided with suitable packing 9 and it is shown with a relatively long skirt portion 10 to form a long bearing surface in engagement with the inner wall of the housing.

Within the housing and interposed between the piston at one end and the end wall of the housing at the opposite end, is a spring 11, shown as helical in form and disposed about the upright portion of the spindle.

The closed chamber within the housing and above the piston may be filled with a suitable lubricant introduced through an oil duct 12 extending down through the upright portion of the spindle and out the side of the spindle at a point within the chamber.

The construction disclosed provides a flexible shock absorbing connection between the road wheels and vehicle frame, and one which in no way interferes with the easy steering of the vehicle. This construction furthermore provides at all times proper lubrication for the steering movements. The oil within the chamber may act also to a certain extent as a shock absorbing body.

It will be evident to those skilled in the art that various changes may be made in structure without departure from the spirit and scope of the invention. As an example the invention might be adapted to other than a steering wheel, in which event the spindle 5 would simply have a straight up and down movement in the spring housing, instead of a combined rotary and vertical movement.

What I claim is:

1. In combination with an axle, an upright cylindrical spring housing carried thereby and provided with a bearing at its upper end, a steering spindle journaled in said bearing and having at its upper end a laterally projecting arm carrying a bearing for a road wheel, a piston on the lower end portion of the spindle, said piston having a relatively long skirt portion working in the housing and providing a long sliding bearing for the lower end of the spindle, said spindle projecting below said piston and beyond the lower end of the housing, a steering arm engaged with said exposed lower end of the spindle and a spring within the housing interposed between said piston and the upper end wall of the housing.

2. A spring mounting for a steering wheel, comprising in combination, an axle, an upright housing carried by said axle and provided with a bearing in one end, a piston operating in the opposite end portion of the housing, a steering spindle pivotally supported at one end in said bearing and engaged at its opposite end with the piston which thereby provides a bearing for said end of the spindle, a spring in the housing interposed between the piston and the bearing end of the housing, laterally projecting arms on the opposite ends of the spindle outside the housing, one of said arms constituting a steering arm and a wheel bearing carried by the other arm.

3. A spring mounting for a steering wheel, comprising in combination, an axle, an upright housing carried by said axle and provided with a bearing in one end, a piston operating in the opposite end portion of the housing, a steering spindle pivotally supported at one end in said bearing and engaged at its opposite end with the piston which thereby provides a bearing for said end of the spindle, a spring in the housing interposed between the piston and the bearing end of the housing, laterally projecting arms on the opposite ends of the spindle outside the housing, one of said arms constituting a steering arm, a wheel bearing carried by the other arm, and a packing element carried by the piston and providing a seal between the piston and surrounding housing.

In witness whereof I hereunto set my hand this 25th day of July, 1919.

CECIL McCOBB BILLINGS.